No. 629,201. Patented July 18, 1899.
A. MÜLLER.
MEANS FOR PREVENTING SPARKING WHEN MAKING AND BREAKING ELECTRIC CIRCUITS.
(Application filed July 13, 1898.)
(No Model.) 3 Sheets—Sheet 1.
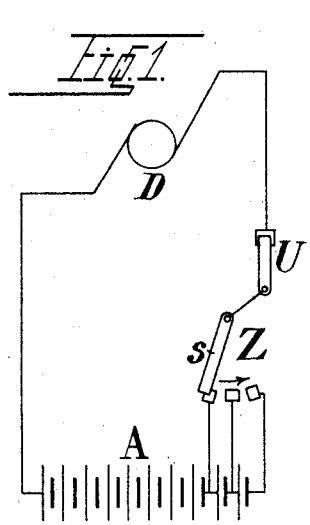
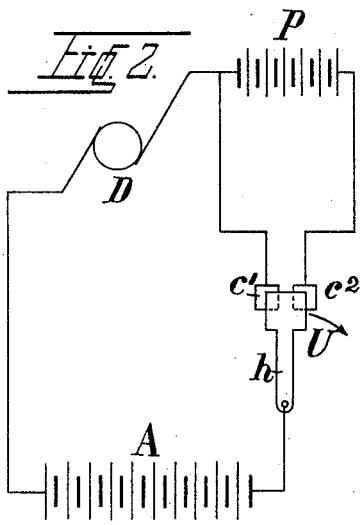
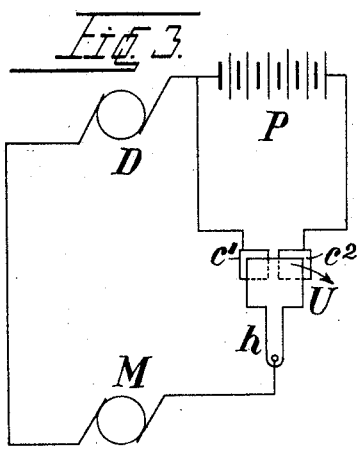
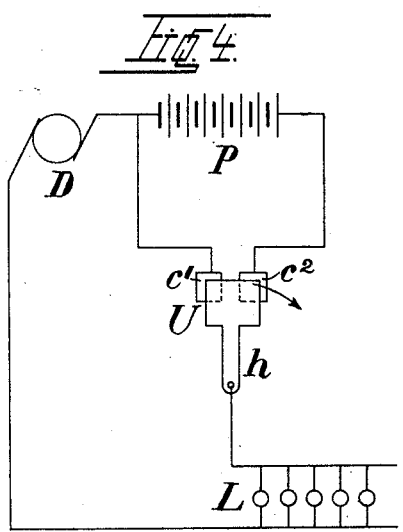
Witnesses.
Julius Lutz.
Theof. Herstr.
Inventor.
A. Müller
By Munn
Attorneys.
THE NORRIS PETERS CO., PHOTO-LITHO., WASHINGTON, D. C.

No. 629,201. Patented July 18, 1899.
A. MÜLLER.
MEANS FOR PREVENTING SPARKING WHEN MAKING AND BREAKING ELECTRIC CIRCUITS.
(Application filed July 13, 1898.)
(No Model.) 3 Sheets—Sheet 2.
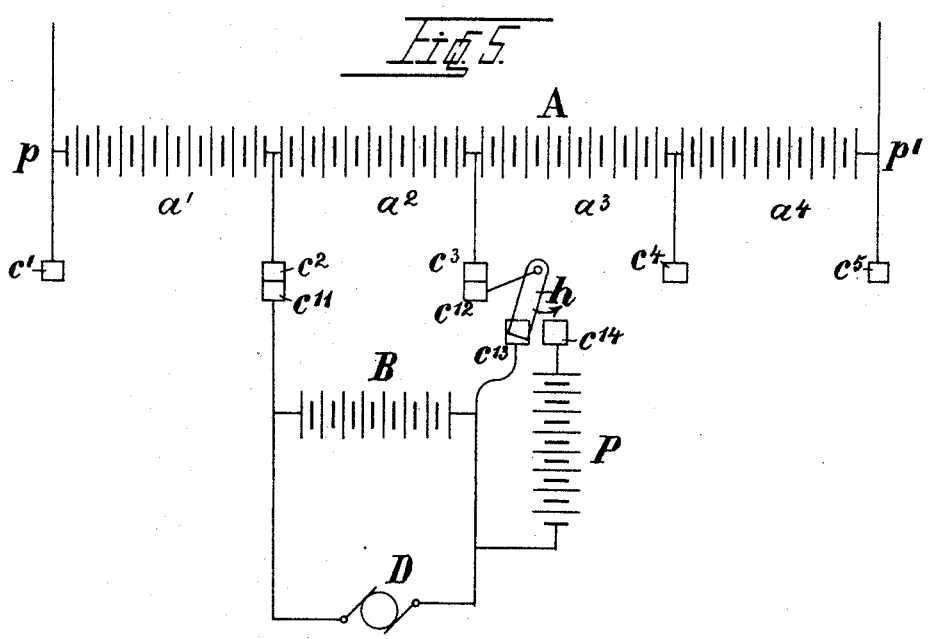

No. 629,201. Patented July 18, 1899.
A. MÜLLER.
MEANS FOR PREVENTING SPARKING WHEN MAKING AND BREAKING ELECTRIC CIRCUITS.
(Application filed July 13, 1898.)
(No Model.) 3 Sheets—Sheet 3.
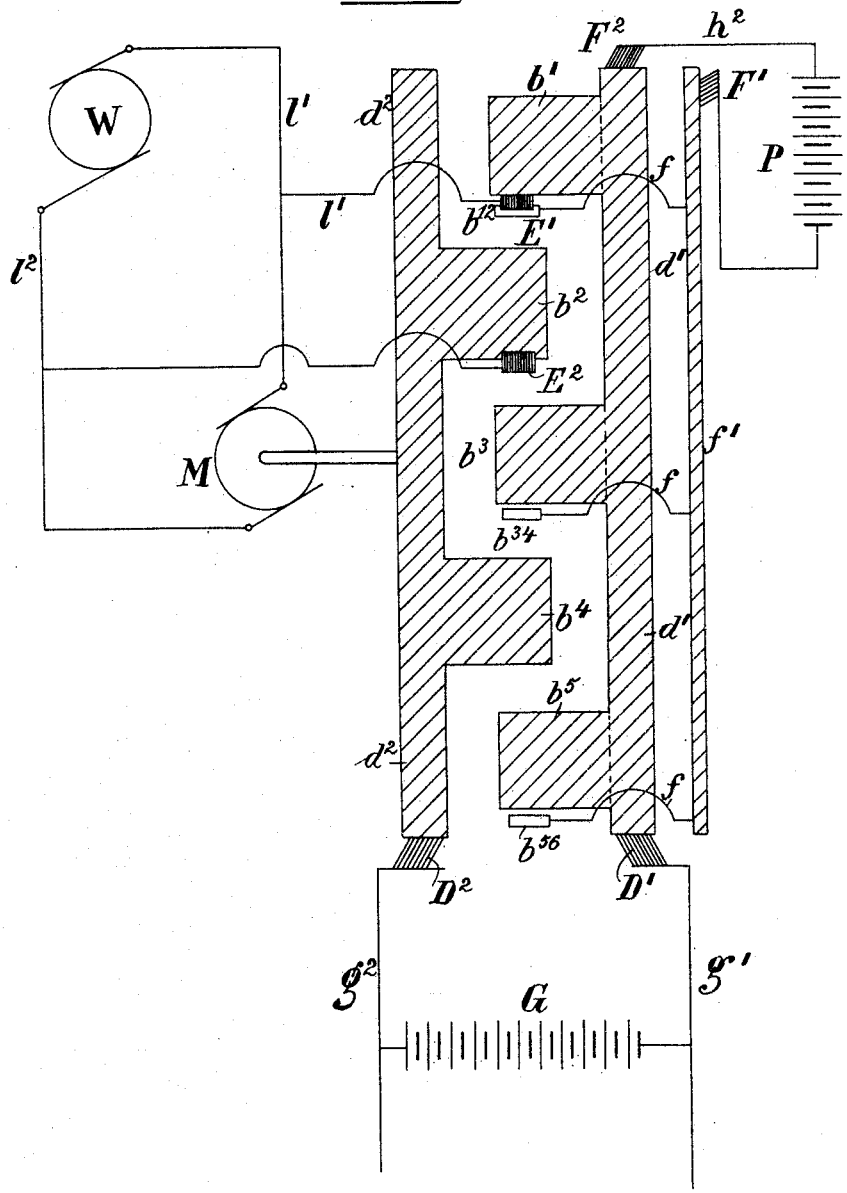

UNITED STATES PATENT OFFICE.

ADOLPH MÜLLER, OF HAGEN, GERMANY.

MEANS FOR PREVENTING SPARKING WHEN MAKING AND BREAKING ELECTRIC CIRCUITS.

SPECIFICATION forming part of Letters Patent No. 629,201, dated July 18, 1899.

Application filed July 13, 1898. Serial No. 685,857. (No model.)

*To all whom it may concern:*

Be it known that I, ADOLPH MÜLLER, of Hagen, Westphalia, in the German Empire, have invented certain new and useful Improvements in Preventing Sparking when Making and Breaking Electric Circuits; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in preventing sparking when making and breaking electric circuits, the said improvements being applicable to all kinds of making-and-breaking devices, and particularly to the transforming of electric currents by means of mechanically-moved switches or commutators and secondary batteries. In such devices as hitherto used for the above-mentioned purposes there exists the unavoidable disadvantage of strong and injurious sparking, which often very seriously affects the life of the switch apparatus. Now this disadvantage is effectually overcome by my invention, which I will now proceed to describe.

If a secondary battery A be connected with the circuit of a dynamo D, Fig. 1, so as to be charged thereby, then the circuit can be broken without the formation of sparks by altering the electromotive force of the battery or accumulator by switching in more cells—for instance, by turning the lever S of the switch Z to the right in such a manner that the difference of potential between the poles of the battery is made the same as that of the dynamo. When this condition is obtained, the circuit has no current flowing through it and it can be broken at U, for example, without the formation of sparks. Any circuit in which an electromotive force is opposed to that of the current source can be broken in a similar manner without sparking by increasing the opposing electromotive force until it equals that of the source of current before breaking the circuit. This is effected according to this invention by introducing into the circuit before disconnection a battery of elements which easily become polarized. Elements suitable for this purpose are, for instance, those consisting of steel plates immersed in a potash-lye, platinum plates in sulfuric acid, clean lead plates in sulfuric acid, or aluminium plates in an alum solution. Such a battery is immediately polarized on entering the circuit to the tension of the current in the said circuit, or it immediately increases any opposing electromotive force which may be present in the circuit until it is equal to that of the source of current, so that current no longer flows through the circuit, which can therefore be broken without sparking.

If, for instance, the current from a dynamo D, Fig. 2, serves to charge a secondary battery or accumulator A, the circuit can be broken without sparking occurring by introducing a polarization-battery P into the said circuit. This can be effected, for instance, by means of a switch U, the contact-lever $h$ of which covers two contacts $c'$ $c^2$, of which the one, $c'$, is in connection with the one pole of the dynamo D and the polarization-battery, the second being connected to the other pole of the polarization-battery, while the contact-lever $h$ forms the second pole of the circuit from the dynamo D. If, now, the lever $h$ be turned from the position shown in the figure, in which position the current flows directly from the pole of the dynamo D through the contact $c'$ to the lever $h$ to the right, then as soon as the said lever $h$ leaves the contact $c'$ the polarization-battery will be connected up in series with the accumulator or second battery A. The battery P is then immediately polarized to a tension which reduces to zero the sum of the electromotive forces of the battery A and of the current source, so that the flow of the current is stopped. If the contact-lever $h$ of the switch U be turned still farther to the right, then at the moment when the lever $h$ leaves the contact $c^2$ the breaking of the circuit without the occurrence of sparking from extra current, as all portions of the circuit are without current.

The breaking or interruption of a circuit with which an electromotor is connected and driven from the current source D is effected in an exactly similar way by means of a similar device, Fig. 3. The lever $h$ can in this arrangement be shifted from the contact $c^2$ by a single movement, so that the breaking of the circuit is effected while the motor M still rotates as a consequence of its momentum, and thereby generates a certain electromotive force. If such should not be the case, the polarization-battery P must before the breaking of the circuit be polarized to the terminal potential of the current source in order to effect the breaking of the current without the formation of sparks. The polarization must, therefore, be formed of a sufficiently large number of elements. In those cases also wherein an opposing electromotive force is not introduced into the circuit—for instance, in simple light installations—the interruption of the circuit can also be effected without sparking by my invention.

For example, when it is desired to switch off a number of arc-lamps L, Fig. 4, by means of such a device then as soon as the contact-lever $h$ touches the contact $c^2$, so that the battery P is introduced into the circuit, the battery P is polarized to the terminal tension of the current source D, whereby the circuit can be interrupted or broken without sparking by further turning the lever $h$.

For transforming continuous current of low tension into a high-tension current the invention can be advantageously employed as illustrated diagrammatically in Fig. 5. This application rests generally upon the known arrangement of charging by means of the dynamo-machine the separate groups $a'\ a^2\ a^3\ a^4$ of a high-tension battery A in their proper sequence, while at the same time current is obtained from the poles $p\ p'$ of the said high-tension battery, the tension of the current obtained being approximately as many times that of the charging-current as there are groups in the high-tension battery. For charging the groups $a'\ a^2\ a^3\ a^4$ the poles $c'\ c^2\ c^3\ c^4\ c^5$ of each group are successively connected to the poles $c^{11}\ c^{12}$ of the dynamo D, the connection being successively broken and made with the next group.

Now in order that each disconnection of a battery group from the dynamo for the purpose of connecting up the next battery group thereto no current shall flow in the circuit to be broken a small polarization-battery P is introduced before disconnecting the said battery group into the charging-circuit in front of the said battery group. This is effected as shown in the accompanying diagram, Fig. 5, by turning to the right the switch-lever $h$, which when the polarization-battery P is not in the circuit connects the contact $c^{13}$, which is in connection with one pole of the dynamo, to the contact $c^{12}$, the said lever being brought into contact with the contact $c^{14}$. In order not to break the circuit while this operation is being effected, the contact-lever $h$ must bridge the insulating space or slit between the two contacts $c^{13}\ c^{14}$. If the polarization-battery P is connected with the circuit, it is without current, and can therefore be disconnected without the formation of any sparks.

The same arrangement can also be employed for introducing the battery groups $a'\ a^2\ a^3\ a^4$ into the circuit without sparking. To this end it is only necessary to connect up the polarization-battery in series with the battery to be introduced into the circuit before switching in the said battery.

The number of cells of the polarization-battery are so chosen that the battery A receives no current at the moment of connecting up, whereby the battery B at this instant receives the whole of the current from the generator D. Furthermore the number of cells in the battery B is made somewhat greater than that of the separate groups of A lying between the terminals, so that the battery B at the time when the charging-current flows through the particular group of cells A not only receives current, but can also give up to A the quantity of electricity received during the switching operation. The described arrangement can also be utilized in a similar manner for transforming currents of high tension to currents of low tension. In this case, also, the polarization P must be so introduced into the circuit that its electromotive force counteracts the electromotive forces at work in the circuits.

The switching operations are in practice not effected by means of the arrangement illustrated diagrammatically in the drawings, but preferably by a mechanically-operated, for instance, a revolving switch or commutator, in such a manner that the various operations are automatically carried out in their proper sequence. The constructional details of such a switch will offer no difficulties to experts and can be carried out in various ways, so that there is no necessity to particularly describe an example thereof.

My invention can also be used for interrupting or breaking alternating currents, as to polarization-batteries of this kind can be given such a small capacity that the condition of their charge can follow the change in the electromotive force of the current source quickly enough to at any moment bring the sum of the latter and of the opposing electromotive force of the consumption apparatus to zero, and to thereby stop the flow of current.

In order to transform an alternating into a continuous current by utilizing this method, a switch device, preferably of the kind diagrammatrically illustrated in Fig. 6, is employed. In this arrangement conductors $l'\ l^2$ extend from the alternating-current dynamo W to two brushes $E'\ E^2$, which slide over the contacts $b'\ b^2\ b^3\ b^4\ b^5$ of a drum-shaped commutator (shown in development in the figure) when the said commutator is rotated by a motor revolved synchronously with the alternating-current dynamo. The contacts $b'\ b^2\ b^3\ b^4\ b^5$ are separated from one another by insulating-slits, the contacts $b'\ b^3\ b^5$ being connected to the ring $d'$ and the other contacts $b^2\ b^4$ to the ring $d^2$, as shown. Currentcollecting brushes D' D² slide upon the rings d' d², the said brushes being connected by conductors g' g² to a secondary battery or accumulator G. The commutator, which rotates synchronously with the alternating dynamo, has for its object to disconnect the accumulator G from the charging-dynamo at that moment in the phase of the alternating current at which the tension of the alternating current drops below that of the battery, and by changing the poles to again connect it to the dynamo at the instant in the next half of the current phase when the tension of the alternating current commences to exceed that of the battery. Such commutator devices are known and do not form part of this invention. It is, however, also known that such commutators, as also those employed for transforming continuous currents, possess the disadvantage that the moment when the tension is equal is never exactly hit upon, so that when disconnecting there is very often a great deal of sparking at the commutator, which soon injuriously affects the latter. According to this invention in order to avoid this disadvantage a polarization-battery P is introduced into the circuit each time before the latter is interrupted or broken. This can be effected by arranging intermediate contacts $b^{12} b^{34} b^{56}$ in the insulating-slits, which said intermediate contacts are connected with a ring $f'$ by insulated wires $f$. Upon this ring $f'$ there slides a brush F', which is in connection with one pole of a polarization-battery P, composed of elements of very small capacity, the other pole of the said battery being connected with a brush F², which slides upon the ring $d'$.

The intermediate contacts $b^{12} b^{34} b^{56}$ are separated from the above-mentioned contacts $b'$ $b^3$ $b^5$ by a narrow insulating-space, which is covered by the brush E' or E², which bridges it, so that the said brush only leaves the contacts $b'$ $b^3$ $b^5$ when it has made contact with the intermediate contacts $b^{12} b^{34} b^{56}$. The second brush E² is so arranged that it only leaves the adjacent contact $b^2$ $b^5$ when the brush E' has left the contact $b'$, and vice versa. With this arrangement while the commutator-drum is synchronously rotating the battery P is introduced into the circuit shortly before the brushes E' E² break the contact between the dynamo, the brushes D' D², and the battery G by leaving the contacts $b^{12} b^{34} b^{56}$—for instance, $b^{12}$—comes into contact with one of the brushes E' E²—for instance, E'—while the other of the two brushes remains in contact with the next following or the next preceding one of the contacts $b'$ $b^2$—for instance, $b^2$—until the other brush has left the contact—for instance, $b'$—next to the corresponding intermediate contact—for instance, $b^{12}$. The battery P is therefore at this instant connected up in series with the battery G, and in consequence of its small capacity will be practically instantaneously charged to a tension which increases the opposing electromotive force of the battery G to such an extent that the said electromotive force becomes exactly equal to the momentary tension of the alternating current, so that the circuit of the dynamo W is without current. If, now, the dynamo W be disconnected, by shifting the brush E' from that one of the contacts $b'$ $b^2$ with which it has remained in contact then no sparking can take place.

For interrupting or breaking polyphase currents without sparking it is necessary to introduce several polarization-batteries into the circuit. For example, before interrupting three-phase current-circuits such batteries must be introduced into two of the three circuits in the manner hereinbefore described.

The polarization-battery can in many cases be replaced by a condenser, the dimensions of which must be suitably calculated.

Instead of the described switch or commutator devices any other suitable devices can be employed for carrying out the invention. For this purpose all that is required is that the devices shall be so designed that a polarization-battery before each interruption or breaking of the circuit shall be connected up in the said circuit in series with the current source and the consumption apparatus, the said battery being designed to become polarized sufficiently quickly to a tension which shall reduce the electromotive forces in the circuit to zero.

Having now described my invention, what I claim, and desire to secure by Letters Patent, is—

1. In a means for preventing sparking on opening and closing an electric circuit, a source of electricity, a consumption apparatus arranged in the circuit, and a polarizing-battery consisting of such a number of cells that it will become polarized up to a higher potential than the difference of potential between the source of current and the consumption apparatus, the polarizing-battery being in series with the source of electricity and with the consumption apparatus, substantially as specified.

2. For preventing sparking in a commutator operating synchronously with an alternating current, a polarization-battery in series with the alternating-current source and a consumption apparatus, the said battery being adapted to bring the commutator-current to zero prior to making and breaking.

In testimony that I claim the foregoing as my invention I have signed my name in presence of two subscribing witnesses.

ADOLPH MÜLLER.

Witnesses:
C. H. DAY,
MAX C. HAEHLER.